(No Model.)
W. M. SCHLESINGER.
ELECTRICAL TRANSMISSION OF POWER.
No. 332,009. Patented Dec. 8, 1885.
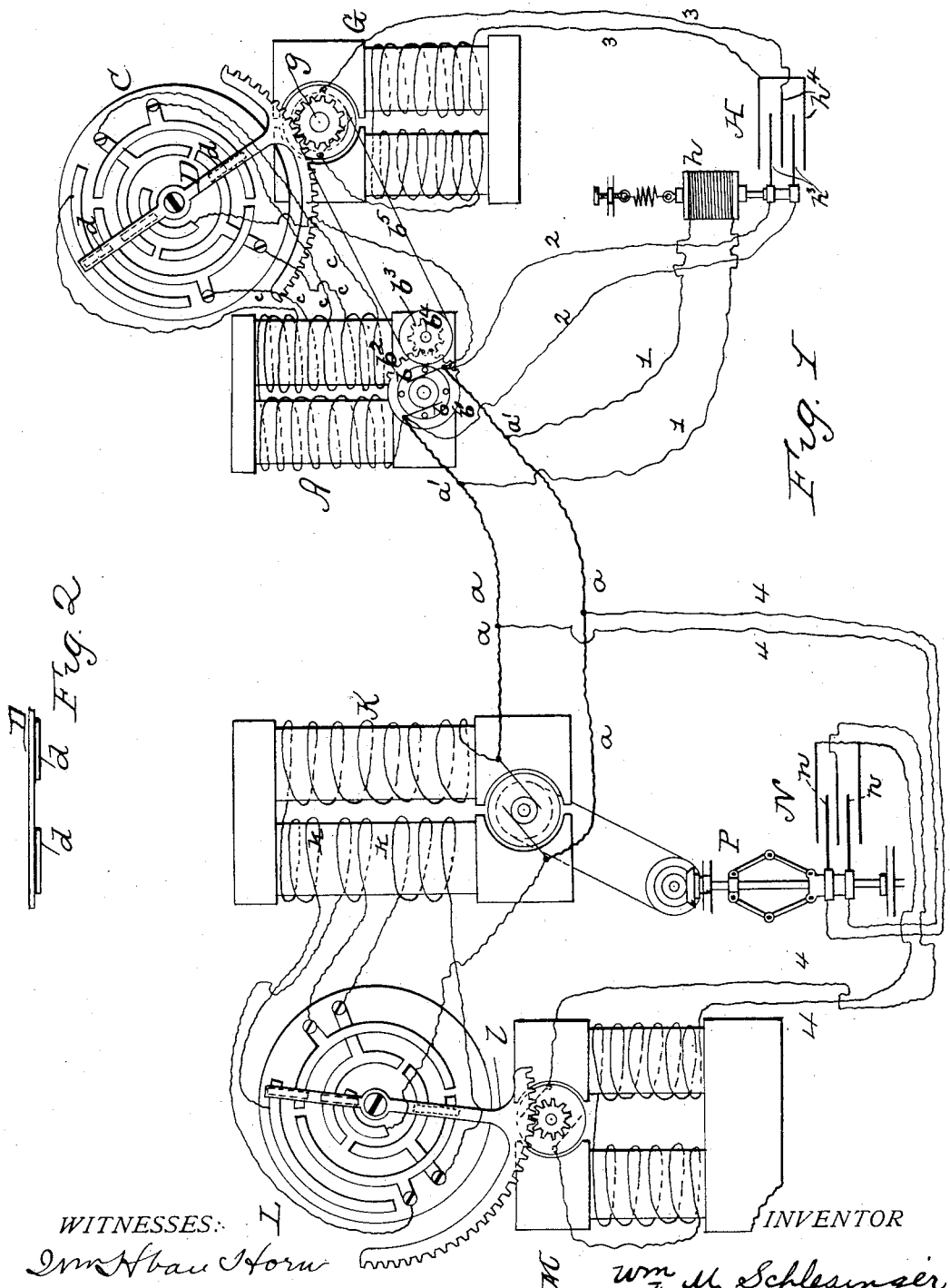
WITNESSES:
INVENTOR
Wm. M. Schlesinger
By S. J. Van Staworen
ATTORNEY

UNITED STATES PATENT OFFICE.

WILLIAM M. SCHLESINGER, OF PHILADELPHIA, PENNSYLVANIA.

ELECTRICAL TRANSMISSION OF POWER.

SPECIFICATION forming part of Letters Patent No. 332,009, dated December 8, 1885.

Application filed September 19, 1885. Serial No. 177,537. (No model.)

*To all whom it may concern:*

Be it known that I, WILLIAM M. SCHLESINGER, a subject of the Queen of Great Britain, residing at Philadelphia, in the county of Philadelphia and State of Pennsylvania, have invented certain new and useful Improvements in the Electrical Transmission of Power, of which the following is a specification, reference being had therein to the accompanying drawings, wherein—

Figure 1 is a diagram showing electric generator and motor appliances embodying my improvements; and Fig. 2 is a detail view of a part of the operating-lever of the current-changing devices or circuit-reversers for the separately-coiled sections of the field-magnets of the motor and generator.

My invention has relation to line-circuits fed by an electric generator and used for running electric motors on the cars for electric railways and for other power purposes; and it has for its object to maintain a constant electromotive force at two points on the line-circuit or the conductors and to regulate the mechanical output of the motor.

My invention accordingly consists of the combination, construction, and arrangement of parts as hereinafter described and claimed, having reference particularly to a line of conductors or a main circuit, a feeding-generator therefor having its field-magnets wound in separate sections the ends of each of which connect to separate segments or plates on a current-changing device or circuit-receiver having movable lever for electrically reversing the direction of the current through a greater or less number of said sections, an electric motor having its armature-shaft in gear with said lever and with the brushes of the generator, and a current changing switch or circuit-reverser controlled by an electromagnet in a shunt or loop derived from the main circuit of the generator and leading to the brushes of said motor, whereby the strength of the field-magnets of the latter is automatically controlled to maintain a constant electromotive force for the generator, and hence for determined points on its line-circuit; and, second, to a motor operated by a current from the generator-circuit having its field-magnets wound in separate sections, the ends of each of which are connected to a current-changing switch or circuit-reverser the same as that above described, the movable switch-lever of which is in gear with the armature-shaft of a second electric motor included in a shunt or loop from the generator-circuit, and having a circuit-reverser or current-changing switch controlled by a governor operated by the armature-shaft of the first-named motor, or that in the main circuit of the generator, whereby the strength of the field-magnets of said motor is varied as desired to automatically control its mechanical output.

In the drawings, $a\ a$ represent a line of conductors which may be used for an electric railway or for other power or translating purposes; A, an electric generator therefor the brushes $b\ b$ of which are preferably mounted upon a plate or disk, $b'$, having peripheral teeth $b^2$ engaging with a pinion, $b^3$, upon a counter-shaft, $b^4$, which is in gear with or has a belt-connection, $b^5$, with the armature-shaft $g$ of an electric motor, G. The field-magnets of generator A are wound in separate sections, and are either in series or shunt relation with each other, and also with the armature of the generator, as desired. The generator may be a separately or a self excited machine. The ends of each of these field-magnet sections are in circuit, as indicated, by wires $c\ c$ with segmental plates concentrically arranged, of a current-changing device or circuit-reverser, C, having a single controlling-lever, D, with insulated strips $d$ (see Fig. 2) for successively reversing the direction of the current through a greater or less number of said sections to vary the strength of the field, and consequently the electro-motive force of the generator, as fully described in a pending application filed by me July 1, 1885.

To automatically vary the strength of the field-magnets of the generator as its electromotive force varies, the lever D is placed in gear with the armature-shaft $g$ of motor G, as shown, or in any suitable manner, and from the brushes of the latter proceeds a shunt, 3 3, which leads to the fixed terminals $h^4$ of a circuit-reverser or current-changing switch, H. The movable terminals $h^3$ of this reverser are in a shunt, 2 2, from the brushes of dynamo A, and are attached to the core or armature of a solenoid or magnet, $h$, having suitable retractile spring with tension-screw, as shown.

From two points, $a'$ $a'$, along the conductors $a$ $a$, at which the electro-motive force is to be kept constant, leads a shunt, T T, which includes solenoid or magnet $h$, which is preferably of a high resistance. Any variation in the electro-motive force of generator A, or at the points $a'$ $a'$ in the outside circuit, affects the solenoid $h$, which acts to raise or lower the reverser-terminals $h^3$ to change the direction of the shunt-current to motor G for revolving its armature in different directions to reversely turn lever D for changing the direction of the current through a greater or less number of the generator field-magnet sections to maintain the strength of said field, and consequently to keep the electro-motive force of the generator constant. At the same time that the lever D is turned or moved, as described, to effect a change in the direction of the current through more or less of the field-magnet sections of generator A the necessary changes in position of its commutator-brushes are automatically made by the motor G through the medium of the gearing $b^2$ $b^3$ and belt-connection $b^5$, between said brushes and the armature-shaft of motor G. The power electric motor K in line-circuit $a$ $a$ has its field-magnets $k$ wound in separate sections, the ends of each of which pass to a circuit-reverser, L, similar in all respects to reverser C. The movable lever $l$ of current-changing switch or reverser L is in gear with a second motor, M, which is in a shunt-circuit, 4 4, from the conductors $a$ $a$, and in which is a circuit-reverser or current-changing switch, N, the movable terminals $n$ of which are controlled by a governor, P, in gear with and operated by the power or main-line motor K. As the strength of the field-magnet $k$ of motor K varies, and its speed is affected thereby, the governor-arms close together or spread apart, to elevate or depress the terminals $n$ of reverser N and change the direction of the current in shunt 4 to and through motor M, for rotating its armature in the proper direction to turn switch-lever $l$ of reverser L to change the direction of the current through a greater or less number of the field-magnet sections $k$, to maintain the strength of said field, and, consequently, the mechanical output of the motor. The electro-motive force of both the generator A and the mechanical output of the motor K being under control of the respective current-changing switches or circuit-reversers H and N are automatically maintained or kept constant, and this result is accomplished whether there be one or more generators and motors in or on the line-circuit $a$ $a$.

What I claim is—

1. The combination of a line-circuit, a generator having its field-magnets wound in sections, a circuit-reverser for said sections, having a movable handle or lever, a derived or shunt circuit from the generator, having a circuit-reverser and an electric motor, power-transmitting devices interposed between the armature-shaft of the motor and the movable handle of the circuit-reverser for the generator field-magnet sections and between said shaft and the generator commutator-brushes, and a shunt or derived circuit from predetermined points along the line-circuit having an electro-magnet provided with an armature in engagement with the movable part of the circuit-reverser in said motor-circuit, whereby the strength of the generator field-magnets is automatically controlled to maintain a constant electro-motive force at said predetermined points on the line-circuit.

2. The combination, with an electric circuit having a generator and automatically-acting devices for maintaining a constant electro-motive force at two points on said circuit, of an electro-motor having a circuit-reverser for its field-magnet sections, a shunt-circuit from the line-circuit having an electro-motor and a circuit-reverser provided with a governor attachment operated by the armature-shaft of the motor in the line-circuit, and transmitting mechanism interposed between the armature-shaft of the electro-motor in the shunt-circuit and the circuit-reverser for the field-magnet sections of the motor in the line-circuit, substantially as and for the purpose set forth.

3. The combination of an electric circuit, a generator and a motor in said circuit and whose field-magnets are wound in sections, circuit-reversers for said sections, and shunt-circuits having electro-motors, circuit-reversers, and regulating devices for automatically-operating the circuit-reversers of the field-magnet sections of the motor and the generator in the line-circuit, as and for the purpose set forth.

In testimony whereof I affix my signature in presence of two witnesses.

WILLIAM M. SCHLESINGER.

Witnesses:
S. J. VAN STAVOREN,
CHAS. F. VAN HORN.